United States Patent
Singh

(10) Patent No.: US 7,434,226 B2
(45) Date of Patent: Oct. 7, 2008

(54) METHOD AND SYSTEM FOR MONITORING A WORKFLOW FOR AN OBJECT

(75) Inventor: Mona Singh, Cary, NC (US)

(73) Assignee: Scenera Technologies, LLC, Portsmouth, NH (US)

(*) Notice: Subject to any disclaimer, the term of this patent is extended or adjusted under 35 U.S.C. 154(b) by 393 days.

(21) Appl. No.: 11/012,600

(22) Filed: Dec. 14, 2004

(65) Prior Publication Data

US 2006/0155713 A1    Jul. 13, 2006

(51) Int. Cl.
G06F 3/00 (2006.01)
G06F 9/44 (2006.01)
G06F 9/46 (2006.01)
G06F 13/00 (2006.01)
G06F 17/50 (2006.01)
G06Q 10/00 (2006.01)
G06Q 30/00 (2006.01)

(52) U.S. Cl. .............................. 719/313; 705/1; 705/7; 705/28

(58) Field of Classification Search ................ 719/320, 719/313; 705/1, 7, 28; 235/462.01, 462.41, 235/472.01, 472.02; 340/825.49
See application file for complete search history.

(56) References Cited

U.S. PATENT DOCUMENTS

| | | | | |
|---|---|---|---|---|
| 5,764,125 A | * | 6/1998 | May | 336/92 |
| 5,856,978 A | * | 1/1999 | Anthias et al. | 370/429 |
| 5,878,401 A | * | 3/1999 | Joseph | 705/22 |
| 5,923,735 A | * | 7/1999 | Swartz et al. | 379/93.12 |
| 6,122,520 A | * | 9/2000 | Want et al. | 455/456.2 |
| 6,341,276 B1 | * | 1/2002 | Bender et al. | 706/50 |
| 6,407,751 B1 | * | 6/2002 | Minami et al. | 715/736 |
| 6,595,417 B2 | * | 7/2003 | O'Hagan et al. | 235/383 |
| 6,616,049 B1 | * | 9/2003 | Barkan et al. | 235/472.03 |
| 6,696,922 B1 | * | 2/2004 | Wong et al. | 340/7.32 |
| 6,729,544 B2 | * | 5/2004 | Navon | 235/462.14 |
| 6,823,373 B1 | * | 11/2004 | Pancha et al. | 709/219 |
| 6,863,218 B2 | | 3/2005 | Muramatsu | |
| 6,942,151 B2 | | 9/2005 | Ehrhart | |
| 7,156,311 B2 | | 1/2007 | Attia et al. | |
| 7,188,158 B1 | * | 3/2007 | Stanton et al. | 709/220 |

(Continued)

OTHER PUBLICATIONS http://www.barcoding.com/detail_symbolsps3000_3046.shtml.

(Continued)

*Primary Examiner*—Meng-Ai An
*Assistant Examiner*—Qing-Yuan Wu

(57) ABSTRACT

A system and method for monitoring a workflow for an object are described. More particularly, embodiments of the present invention include sending workflow information to at least one mobile device operated by a recipient of the object. The workflow information associates the object with the at least one mobile device and includes sender-generated metadata identifying a sender of the object. The present invention also includes detecting the object using the at least one mobile device when the object is delivered to the recipient. The present invention also includes receiving from the at least one mobile device user-generated metadata associated with the object, wherein the sender-generated and user-generated metadata facilitate in monitoring the object in the workflow. As a result, the object is accurately and reliably monitored in the workflow.

26 Claims, 4 Drawing Sheets

U.S. PATENT DOCUMENTS

| | | | |
|---|---|---|---|
| 2002/0002504 A1* | 1/2002 | Engel et al. | 705/26 |
| 2002/0111869 A1* | 8/2002 | Shuster et al. | 705/23 |
| 2002/0184402 A1* | 12/2002 | Gangopadhyay | 709/315 |
| 2004/0119605 A1* | 6/2004 | Schaper | 340/825.49 |
| 2004/0209230 A1* | 10/2004 | Beu et al. | 434/72 |
| 2004/0220998 A1* | 11/2004 | Shenfield et al. | 709/201 |
| 2005/0005259 A1* | 1/2005 | Avery et al. | 717/103 |
| 2005/0198095 A1* | 9/2005 | Du et al. | 709/200 |

OTHER PUBLICATIONS http://www.wifizonenews.com/publications/page207-488625.asp.

U.S. Appl. No. 10/887,287, filed Jul. 8, 2004, entitled "Method and System for Utilizing a Digital Camera for Retrieving and Utilizing Barcode Information".

Pryor, R., "GPS and Barcode Pipe Data Collection," GISdevelopment.net, GIS for Oil & Gas Proceedings 2001, pp. 1-6.

* cited by examiner

METHOD AND SYSTEM FOR MONITORING A WORKFLOW FOR AN OBJECT

RELATED CO-PENDING PATENT APPLICATIONS

The present invention is related to a co-pending U.S. application Ser. No. 10/887,287, filed on Jul. 8, 2004, and entitled "Method and System for Utilizing a digital camera for retrieving and utilizing barcode information."

FIELD OF THE INVENTION

The present invention relates to workflow monitoring, and more particularly to a method and system for monitoring a workflow for an object.

BACKGROUND OF THE INVENTION

Various technologies have been utilized to track packages during delivery. For example, universal product code (UPC) reader technologies have long existed, and are used for tracking packages. Radio frequency identification (RFID) technologies are emerging, and can identify objects to which RFID tags have been attached. RFID technology is merely a low-level enabler. That is, RFID tags function similar to UPC techniques to identify objects.

A problem with conventional UPC reader technologies is that they can be tedious and time consuming to use. For example, a package delivery person can use a device to scan a bar code on the package when delivering a package to a recipient. The delivery person can collect the recipient's signature electronically using the device. The delivery person then enters the name of the recipient into the device. The delivery person may then push certain keys on the device to complete the delivery transaction.

A second problem with conventional UPC reader technologies is that there are limitations as to how an accountable person can be associated with the package, and how easily information can be transmitted to the other participants with regard to the package. Some staff members (e.g. the logistics staff members) may be given custom devices. However, such devices can be expensive, and it may be inconvenient to learn how to use such devices. Accordingly, it may not be cost effective for everyone (for instance staff members only informally involved in the workflow) to have or to be trained to use such a device.

SUMMARY OF THE INVENTION

The present invention provides a method and system for monitoring a workflow for an object. According to the method and system disclosed herein, the present invention comprises sending workflow information to at least one mobile device operated by a recipient of the object, wherein the workflow information associates the object with the at least one mobile device and includes sender-generated metadata identifying a sender of the object. The present invention also comprises detecting the object using the at least one mobile device when the object is delivered to the recipient. The present invention also comprises receiving from the at least one mobile device user-generated metadata associated with the object, wherein the sender-generated and user-generated metadata facilitate in monitoring the object in the workflow. As a result, the object is accurately and reliably monitored in the workflow.

DETAILED DESCRIPTION OF THE INVENTION

The present invention relates to workflow monitoring, and more particularly to a method and system for monitoring a workflow for an object. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

The present invention provides a workflow monitoring method and system that uses mobile devices, such as cell phones, personal digital assistants (PDAs), and the like, to monitor objects in a workflow. A workflow describes how a task or tasks are done, by whom, in what order, and how quickly. Each mobile device is associated with one or more objects and is configured to identify the objects upon arrival, and is configured to receive and send workflow information specific to the objects. As a result, the objects are accurately and reliably monitored in a workflow.

Although the present invention disclosed herein is described in the context of mobile devices, the present invention may apply to other types of communication devices and still remain within the spirit and scope of the present invention.

Figure 1:
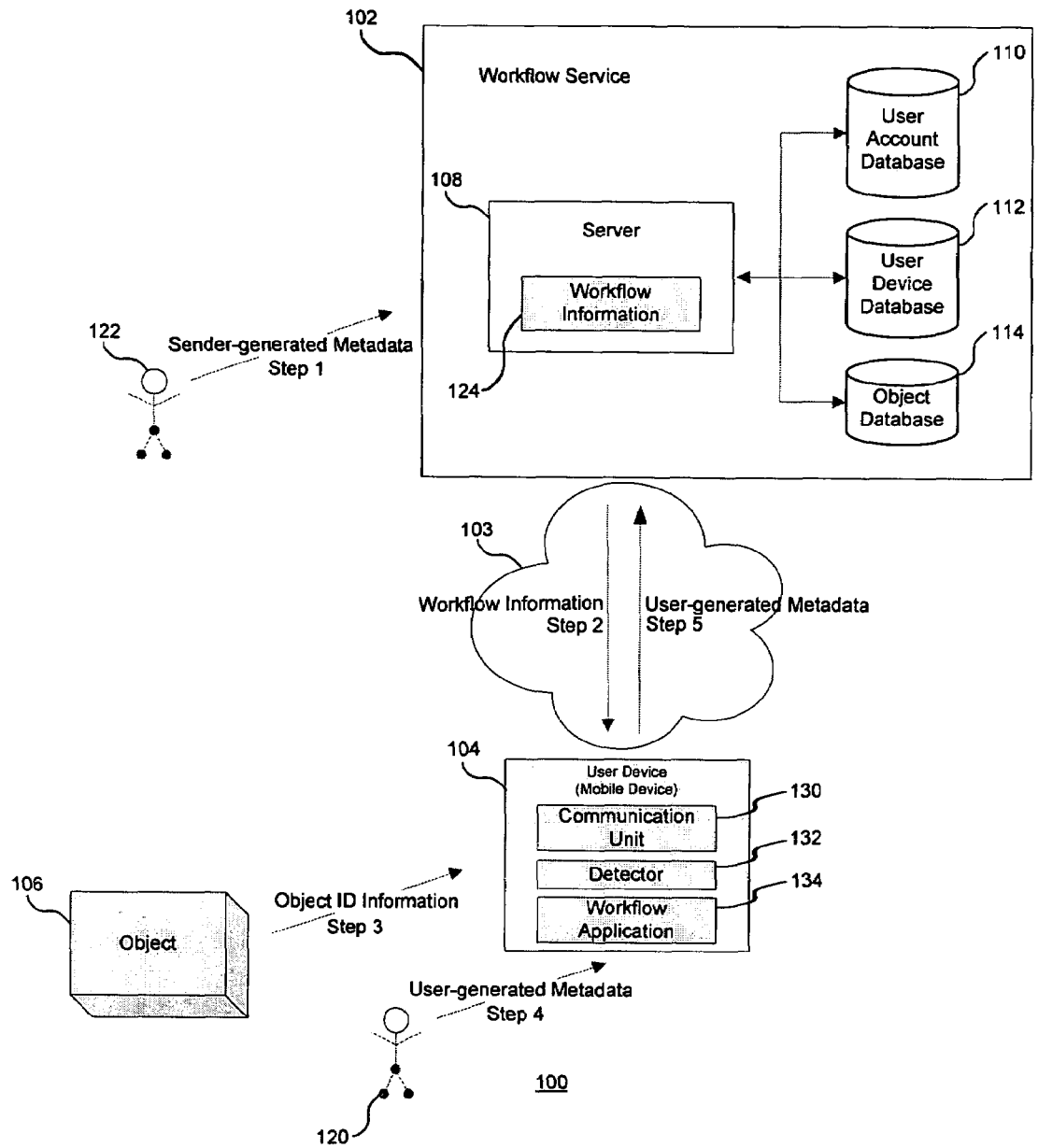
FIG. 1 is a block diagram of a workflow monitoring system in accordance with the present invention.

FIG. 1 is a block diagram of a workflow monitoring system 100 in accordance with the present invention. The workflow monitoring system includes a workflow service 102, a network 103, a user device 104, preferably a mobile device such as a cell phone having a one or more voice functions, and an object 106, preferably a physical object. The workflow service 102 includes a server 108, which has access to a user account database 110, a user device database 112, and an object database 114. The user account database 110 stores information associated with the senders and users (e.g. names, account numbers, addresses, contact information). The user device database 112 stores information associated with user devices (e.g. names and user device ID). The object database 114 stores information associated with objects (e.g. an object ID).

The user device 104 is operated by a user 120 and is configured to monitor a delivery of the object 106 under direction of the workflow. For ease of illustration, one user device 104 is described in this specific embodiment. However, more than one user device 104 can be used and still remain within the spirit and scope of the present invention. According to the present invention, the user device 104 comprises a communication unit 130 (which may comprise a receiver, transmitter, or transceiver), a detector 132 (which may comprise various devices such as a camera, a UPC scanner, or an RFID reader), and a workflow application 134.

In operation, a sender 122 who wishes to send the object 106 to the recipient user 120 using the workflow service 102 begins a configuration process in step 1 by providing to the server 108 sender-generated metadata. In a preferred embodiment, the sender-generated metadata includes identification of the sender 122, package identifying codes (UPC or RFID) of the object 106 (hereinafter referred to as an object ID), messages or special instructions regarding the object 106 (e.g. delivery deadline), identification of the recipient, and a delivery location.

A workflow designer or systems analyst designs the workflow based on the information provided by the sender 122 and incorporates the sender-generated metadata into the workflow and workflow constraints. As described above, the workflow describes how a task or tasks are done, by whom, in what order, and how quickly. The workflow also describes the flow of work between individuals and/or business enterprises. The workflow may involve different parties handling objects. A typical example is the delivery of a physical package from one individual to another. Workflow constraints are parameters that guide handling of the object 106 in the workflow. Enterprises can host the server 108 or can rely on a service provider who can specify canned or standardized workflows for the typical usage scenarios. In an alternative embodiment, the sender 122 inputs information into a form, and the workflow is automatically generated by the server 108.

The completed workflow information 124 comprises metadata (e.g. sender-generated metadata, user-generated metadata), a workflow, workflow constraints, user information, user device information, etc.

In step 2, the server 108 downloads portions of the workflow information 124 (including the object ID, workflow, workflow constraints, etc.) over the network 103 to the user device 104, wherein the workflow information associates the object 106 with the user device 104. In a preferred embodiment, the server 108 identifies which device 104 to send the workflow information 124 to by querying the user device database 112 with the identification of the recipient (e.g., recipient's name) to retrieve the user's corresponding device ID (e.g. mobile device number, email address, and the like).

In step 3, when the object is delivered to the recipient user 120, the user device 104 detects the object ID associated with the object 106 and compares the detected object ID with the object ID in the workflow. If there is a match, the user device 104 notifies the server 108 that the object 106 has been received. The device 104 may also report its location, and therefore the object 106 location to the service for monitoring.

The user 120 then proceeds according to the workflow and workflow constraints presented by the device 106. As stated above, workflow constraints are parameters that guide handling of the object 106 in the workflow. For example, a constraint may be that the object 106 is to be handled by a particular person in a particular step in the workflow sequence. Another constraint example is that the object 106 may have a time limit for each required action in the workflow. If the user device 104 is associated with multiple objects that are related in the workflow, the user device 104 can verify if all expected objects have been received. For example, in a computer assembly scenario, both a monitor and a CPU may be the expected objects but may arrive at different times. Constraints may also involve local requirements, where, for example, a specific power supply or Ethernet cord may be required before a user may handle a particular computer. Embodiments of the present invention determine if such constraints are being satisfied. The constraint language can be simple yet sufficient for common scenarios. For example, the constraint language can allow Boolean operators, temporal precedence, prerequisites, etc.

In step 4, the user device 104 captures new user-generated metadata about the object 106 when prompted by the workflow application 134 running on the user device 104. For example, the user 120 can record whether the object 106 has been damaged or whether a packaging slip has been forwarded to accounts payable. In step 5, the user device 104 sends the new user-generated metadata to the server 108 to be incorporated into the existing metadata associated with the object 106. The user device 104 may also download previously uploaded user-generated metadata from the server 108 to monitor prior actions taken with respect to the object 106, as explained below.

According to the present invention, the workflow information system 100 monitors the movement of the object 106 in a manner that respects the workflow constraints (rather than merely knowing where the object 106 is geographically located). For example, if the user 120 is off-site and needs the object 106, it may not be appropriate to drop it off on the user's desk while the user 120 is away. It may be more appropriate to send it directly to the user's actual (current) location.

In one preferred embodiment, the workflow service 102 is a delivery service organization that delivers a package (i.e. the object 106) to the user 120. The user 120 is of the general public (i.e. not within the delivery service organization).

Figure 2:
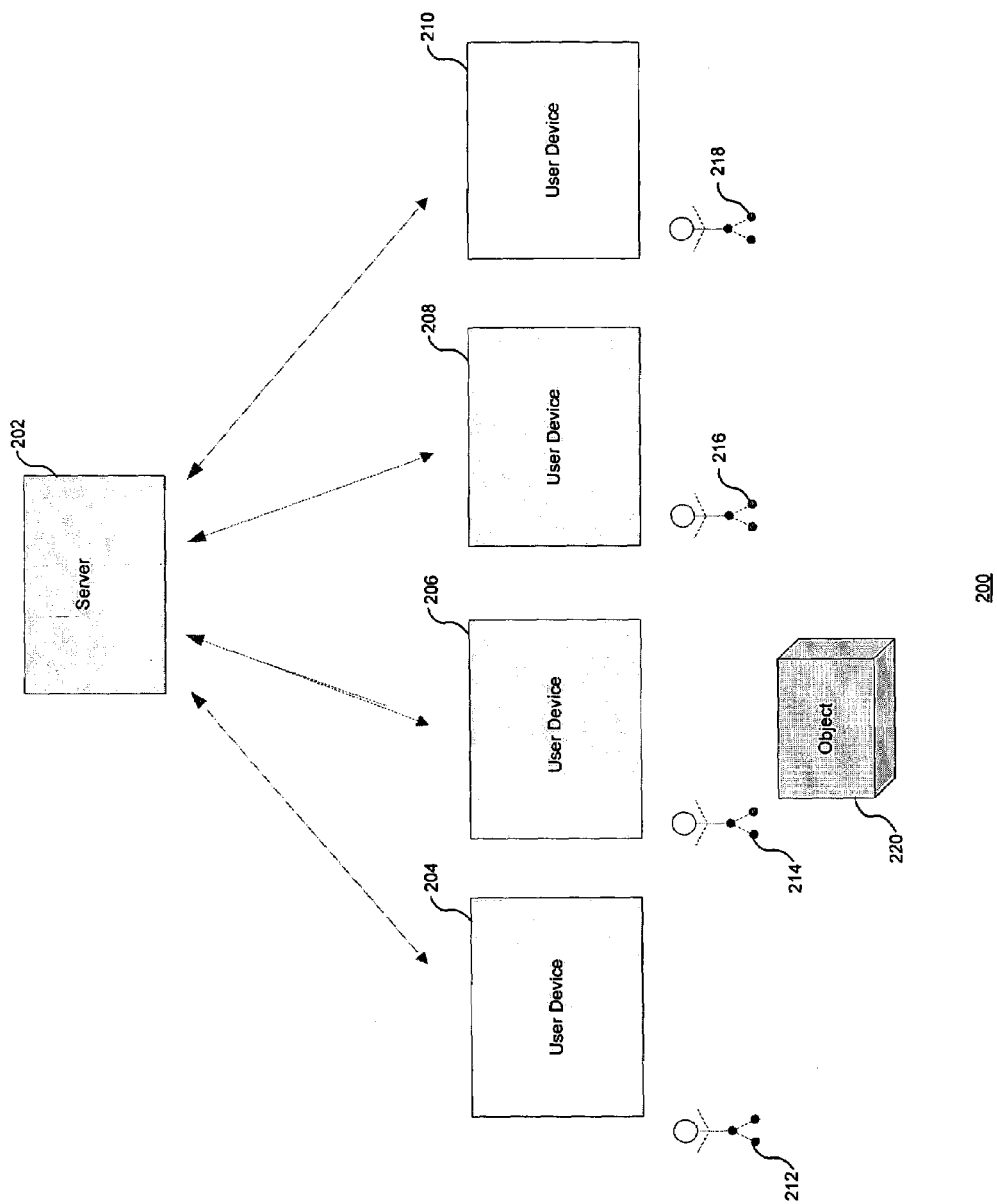
FIG. 2 is a block diagram of a workflow monitoring system in accordance with another embodiment of the present invention.

FIG. 2 is a block diagram of a workflow monitoring system 200 in accordance with another embodiment of the present invention. The workflow monitoring system 200 includes a server 202 and user devices 204, 206, 208, and 210, which are operated by users 212, 214, 216, 218, respectively, to process an object 220 as specified by the workflow 120. The server 202 and user devices 204-210 operate similarly to those of FIG. 1, except that there are multiple user devices and users involved in the workflow. The users 212-218 may be within the same organization, or alternatively, one or more of the user 212-218 can be outside the organization.

The user devices 204-210 can access metadata from the server 108 regarding actions taken by prior users. Such metadata can allow the users 212-218 to verify whether prior users have performed required actions on the object 220. For example, assume that the object 220 is computer, and the workflow constraints required that a prior user (e.g. a system administrator) install enterprise software on the computer and confirm completion of the installation before the next step in the workflow can be performed. The prior user submits user-generated metadata containing the confirmation to the server 202, after which the confirmation gets incorporated into the existing metadata associated with the object 220. This metadata is then available to subsequent users in the workflow path.

Figure 3:
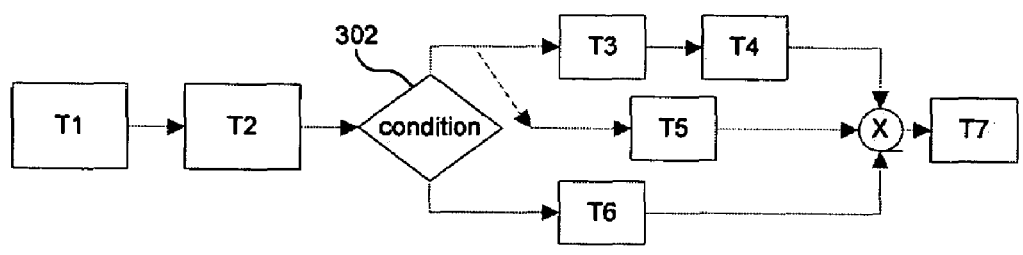
FIG. 3 is a block diagram of an example workflow, which the workflow monitoring system of FIGS. 1 and 2 can monitor, in accordance with the present invention.

FIG. 3 is a block diagram of an example workflow 300, which the workflow monitoring systems of FIGS. 1 and 2 can monitor, in accordance with the present invention. The workflow 300 includes tasks T1, T2, T3, T4, T5, T6, and T7. One or more users may be involved in the workflow 300. In this specific example, more than one user is involved. For example, referring to FIGS. 2 and 3 together, one user 212 can be responsible for tasks T1 and T2, one user 214 can be responsible for tasks T3, T4, and T5, one user 216 can be responsible for task T6, and one user 218 can be responsible for task T7.

The workflow 300 can include test conditions such as condition 302. As such, after task T2 is completed, if the condition is met, the object 220 may flow to the user 214 responsible for tasks T3, T4, and T5. If the condition is not met, the object 220 may flow to the user 216 responsible for task T6. The condition can involve various requirements related to attributes, features, performance, etc. The specific condition will depend on the specific application.

The workflow 300 includes constraints, as described above. For example, if the user 214 is responsible for tasks T3, T4 and T5, the workflow can restrict the performance of these tasks such that task T3 should precede task T4, but task T5 can be performed in any order with respect to tasks T3 and T4. Also, each task T3, T4, and T5 can require a distinct object to be received by the user 214. If appropriate, the object could be shipped by different parties. They could arrive out of order. Again, what is restricted in this specific example is the order of tasks T3 and T4.

With any given task, whenever the object 220 for that particular task arrives, the user device (e.g. 206) detects the object 220 and informs the user (e.g. 214) that that task is now enabled. The user device 206 also informs the user 214 whether all prior objects have been received. Also, if the expected arrival times for the objects have been received, the user device 206 lets the user 214 know if the delivery of a given object is early or late. When the user 214 completes the task, the user 214 indicates this to the user device 206, and the task is marked as complete in the metadata associated with the object 220. Accordingly, the metadata facilitates in monitoring the object 220 in the workflow, since the metadata includes prior actions taken with respect to the object.

As can be seen, the workflow information includes information regarding an order of tasks associated with the object 220. The workflow information can also be used to facilitate end-to-end object tracking. This is possible because workflow events (e.g. each object-receiving event) can be associated with specific user devices 204-210. The user devices 204-210 also help identify the location of the given object 220 and the responsible users 212-218.

Figure 4:
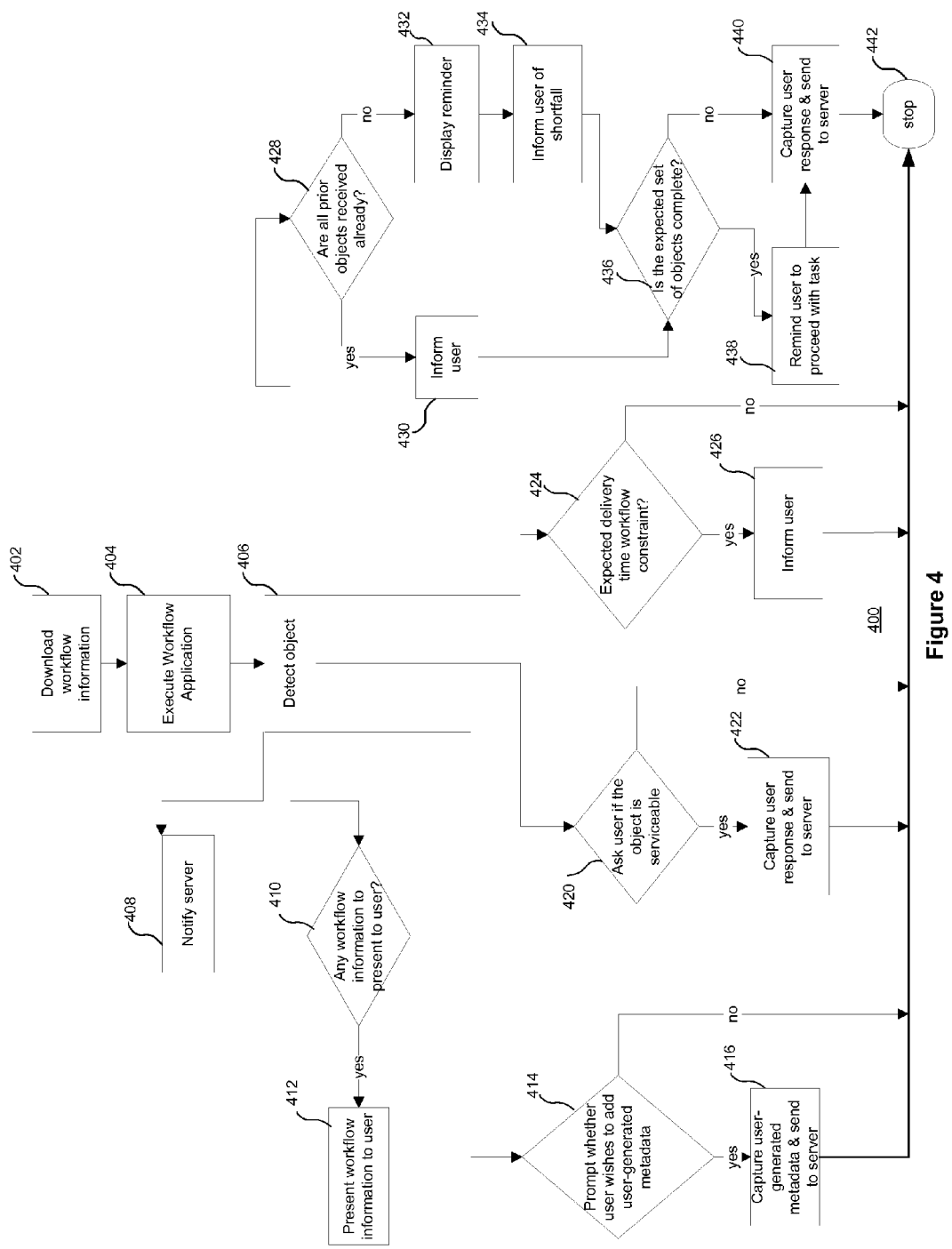
FIG. 4 is a flow chart showing a method for monitoring a workflow in accordance with the present invention.

FIG. 4 is a flow chart showing a method for monitoring a workflow in accordance with the present invention. For ease of illustration, one user device is described in this specific embodiment. However, more than one user device can be used. Accordingly, the flow chart of FIG. 4 can apply to multiple user devices such as those in FIG. 2 and still remain within the spirit and scope of the present invention.

Referring to both FIGS. 1 and 4 together, the method is performed by the workflow application 134 on the user device 104. The process begins in step 402 when the workflow information 124 is downloaded from the server 108 to the user device 104. The workflow information 124 associates the object 106 with the user device 104. The workflow information 124 also includes workflow constraints, workflow instructions, and metadata.

In step 404, the workflow application 134 is executed. In step 406, the user device 104 detects the object, which typically occurs as the object is delivered to the user 120 or when the object comes within a detectable range of the user device 104, or anytime thereafter. The user device 104 identifies the object by scanning a UPC on the object 106 or by sensing a RFID tag on the object 106. The user device 104 can also capture an image of the UPC, where the detector 132 comprises a camera. In a preferred embodiment, the user device 104 is a cell phone equipped with a camera, such as a camera phone, is used.

The captured image is then converted into a barcode number. One embodiment for a system for capturing a UPC image and converting it into a barcode number is described in a co-pending U.S. application Ser. No. 10/887,287, filed on Jul. 8, 2004, and entitled "Method and System for Utilizing a digital camera for retrieving and utilizing barcode information," and is herein incorporated by reference.

After the object ID of the object 106 is detected, the workflow application 134 executes one or more of the following steps based on the workflow constraints. In step 408, the user device 104 sends a notification of receipt to the server 108 at any point after identifying the object 106. This notification becomes part of the metadata specific to the object 106. Also, the server 108 may send a notification of receipt to the sender 122.

In step 410, the user device 104 determines if any workflow information 124 needs to be presented to the user. If yes, the user device 104 presents the workflow information 124 to the user 120 in step 412. The workflow information 124 may include workflow instructions and/or metadata, if any. A workflow instruction may include, for example, "After you have examined this original document, please forward it to the Boston office within 24 hours; you may keep a copy."

Based on the workflow constraints, the user device 104 prompts the user 120 to optionally enter user-generated metadata in step 414. The user-generated metadata can be a comment regarding the execution of the workflow. For example, the user 120 may state that the object 106 has been received as expected. The user 120 may state that the object 106 was delivered on time, or late, etc. In step 416, the user 120 optionally enters the user-generated metadata, which is then sent to the server 108. After the user-generated metadata is received from the user device 104, the existing metadata at the server 108 is updated to include the current user-generated metadata. As such, any other user device that subsequently receives metadata from the server would also have prior user-generated metadata from prior user devices in addition to the sender-generated metadata and prior actions taken with respect to the object. In other words, metadata updated with the user-generated metadata becomes available to other users via their user devices.

In step 420, the user device 104 prompts the user 120 as to whether the object 106 is serviceable (i.e. functional). In step 422, the user 120 enters a response, which is then sent to the server 108.

In step 424, the user device 104 determines whether there is an expected delivery time workflow constraint for the object 106. In step 426, the user device 104 compares the time that the object was received/detected to the expected time to determine whether the object was delivered early, late, or on time. The user device 104 then displays a message to the user 120 or to the sender 112 indicating whether the object 106 was delivered early, late, or on time.

In step 428, the user device 104 determines if all required prior objects associated with the object 106 in the workflow have been received. If yes, the user device informs the user in step 430. In step 432, if all prior objects have not been received, the user device 104 displays a reminder to the server 108 and/or a party from whom the required prior objects are expected to be received, indicating that all prior objects have not yet been received. In an alternative embodiment, the user device can send a reminder to the server or the party from whom the prior objects are expected to be received. In step 434, the user device 104 informs the user 120 of a shortfall.

In step 436, the user device 104 determines if the expected set of objects is complete. This includes determining whether an entire set of objects that the user needs to perform his or her tasks is complete. This holds even if the objects might have arrived out of order. By contrast, step 428 merely checks whether the objects stated to be prior to a given object have been received when that object is received.

If yes, the user device 104 reminds the user 120 to proceed with the user's task(s) in step 438. In step 440, the user 120 enters a response, which is then sent to the server 108. The response can be a confirmation that the user's tasks are complete and/or whether the user 120 has sent the object 106 to a subsequent user in the workflow. In step 442, the workflow completes if the user 120 is the ultimate user.

The workflow information system provides great potential value not only for package delivery but also for distributed work applications, in general. Whenever work is performed by a number of people within or across an organization, there is some association with objects. As such, there is a need to monitor such workflows in a manner that is based on the objects. The following are some examples of alternative embodiments.

In another specific embodiment, the workflow information system can track supplies within an organization. As such, the workflow information system can ensure that workers who request specific supplies (e.g. printer cartridges) do in fact receive them. Supplies can be a significant operational expense and are frequently mismanaged, lost, or erroneously stocked. The workflow information system prevents such problems.

In another embodiment, the workflow information system can facilitate the enforcement of enterprise policies. For example, the workflow information system can ensure that an object is processed in a specified sequence or by specified staff to ensure that enterprise needs are met.

According to the system and method disclosed herein, the present invention provides numerous benefits. For example, it ensures that workflows for objects are monitored properly. Embodiments of the present invention also utilize inexpensive and simple devices such as mobile devices as a part of the workflow.

A method and system for monitoring a workflow for an object have been disclosed. The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be stored in some form of computer-readable storage medium such as memory or CD-ROM and is to be executed by a processor. In addition, the software can be contained in a computer-readable transmission medium, which is intended to include a computer readable signal, which may be, for example, transmitted over a network. Accordingly, many modifications may be made by one of ordinary skill in the art without departing from the spirit and scope of the appended claims.

I claim:

1. A method for monitoring a workflow for an object, the method comprising:
    receiving workflow information on at least one mobile device operated by a recipient of an object, wherein the workflow information associates the object with the at least one mobile device and includes sender-generated metadata identifying the object and identifying a sender of the object;
    detecting the object using the at least one mobile device by receiving information identifying the object and comparing the received information identifying the object with the sender-generated metadata identifying the object, wherein the object is not received on the at least one mobile device; and
    sending from the at least one mobile device user-generated metadata associated with the object to a workflow service responsive to determining the received information identifying the object matches the sender-generated metadata identifying the object, wherein the user-generated metadata includes a notification for the sender of the object that the object has been received.

2. The method of claim 1, wherein the sender-generated metadata associated with the object includes at least one of an identification of the recipient, a delivery location, and messages or instructions regarding the object.

3. The method of claim 2 further comprising identifying which mobile device to send workflow information to by querying a user device database with the identification of the recipient to retrieve a corresponding device ID.

4. The method of claim 1 further comprising presenting the workflow information to the recipient.

5. The method of claim 1 further comprising downloading existing metadata to the at least one mobile device, wherein the existing metadata comprises the sender-generated metadata, prior user-generated metadata, and prior actions taken with respect to the object.

6. The method of claim 1 further comprising capturing user-generated metadata regarding the execution of the workflow when prompted by a workflow application running on the at least one mobile device.

7. The method of claim 6 further comprising updating existing metadata at a server to include the captured user-generated metadata.

8. The method of claim 1 further comprising determining whether there is an expected delivery time workflow constraint for the object.

9. The method of claim 8 further comprising determining whether the delivery of the object is early, late, or on time.

10. The method of claim 9 further comprising displaying a message to at least one of the recipient and the sender of the object indicating whether the object was delivered early, late, or on time.

11. The method of claim 1 further comprising determining if all required objects associated with the object in the workflow have been received.

12. The method of claim 11 further comprising sending a reminder to a server or a party from whom the required objects are expected to be received, if all of the required objects have not been received.

13. The method of claim 1 further comprising ensuring that the object is processed in a specified sequence or by specified staff.

14. The method of claim 1 further comprising associating the object and workflow events with specific mobile devices.

15. The method of claim 1 wherein the at least one mobile device detects the object utilizing radio frequency identification (RFID) technology.

16. The method of claim 1 wherein the at least one mobile device detects the object by capturing an image of a barcode associated with the object.

17. The method of claim 1 wherein the at least one mobile device detects the object by scanning a barcode associated with the object.

18. A computer readable storage medium containing program instructions for monitoring a workflow for an object, the program instructions which when executed by a computer system cause the computer system to execute a method comprising:

receiving workflow information on at least one mobile device operated by a recipient of an object, wherein the workflow information associates the object with the at least one mobile device and includes sender-generated metadata identifying the object and identifying a sender of the object;

detecting the object using the at least one mobile device by receiving information identifying the object and comparing the received information identifying the object with the sender-generated metadata identifying the object, wherein the object is not received on the at least one mobile device; and sending from the at least one mobile device user-generated metadata associated with the object to a workflow service responsive to determining the received information identifying the object matches the sender-generated metadata identifying the object, wherein the user-generated metadata includes a notification for the sender of the object that the object has been received.

19. A system for monitoring a workflow of an object, the system comprising:
a server connected to a network for providing workflow information; and
a mobile device operated by a recipient of a object and connected to the network, the mobile device configured to receive the workflow information that includes sender-generated metadata identifying the object from the server, to detect the object by receiving information identifying the object and compare the received information identifying the object with the sender-generated metadata identifying the object, and transmit user-generated metadata associated with the object to the server responsive to determining the received information identifying the object matches the sender-generated metadata identifying the object;
wherein the object is not received on the mobile device, the user-generated metadata includes a notification that the object has been received for the sender of the object, and the workflow information associates the object with the mobile device and includes sender-generated metadata identifying a sender of the object.

20. The system of claim 19, wherein the sender-generated metadata associated with the object includes at least one of an identification of the recipient, a delivery location, and messages or instructions regarding the object.

21. A mobile device for monitoring a workflow of an object, the mobile device comprising:
a receiver for receiving workflow information that associates an object with the mobile device and includes sender-generated metadata identifying the object and identifying a sender of the object;
a detector for detecting the object by receiving information identifying the object and comparing the received information identifying the object with the sender-generated metadata identifying the object, wherein the object is not received on the mobile device; and
a transmitter for sending user-generated metadata associated with the object responsive to determining the received information identifying the object matches the sender-generated metadata identifying the object, wherein the user-generated metadata includes a notification for the sender of the object that the object has been received.

22. The mobile device of claim 21, wherein the detector comprises: radio frequency identification (RFID) circuitry configured to detect the object using an RFID tag included with the object; wherein the mobile device is configured to include in the user-generated metadata information associated with the RFID tag as a notification that the object has been received.

23. The mobile device of claim 21, wherein the detector comprises: an image capture device configured to capture an image of the object; wherein the mobile device is configured to include the image in the user-generated metadata information as a notification that the object has been received.

24. The mobile device of claim 23, wherein the image includes a barcode associated with the object.

25. The mobile device of claim 21, wherein the detector comprises: a scanner configured to detect a barcode associated with the object;
wherein the mobile device is configured to include in the user-generated metadata information associated with the barcode as a notification that the object has been received.

26. A method for monitoring a workflow for a physical object, the method comprising:
receiving workflow information on at least one cell phone operated by a recipient, wherein the at least one cell phone has at least one voice function, and wherein the workflow information associates a physical object with the at least one cell phone and includes sender-generated metadata identifying the object and identifying a sender of the object;
detecting the physical object using the cell phone by receiving information identifying the object and comparing the received information identifying the object with the sender-generated metadata identifying the object, wherein the object is not received on the cell phone; and
sending from the at least one cell phone user-generated metadata associated with the physical object to a workflow service responsive to determining the received information identifying the object matches the sender-generated metadata identifying the object, wherein the user-generated metadata includes a notification for the sender of the object that the object has been received.

* * * * *